(12) United States Patent
Bish

(10) Patent No.: US 11,078,354 B2
(45) Date of Patent: Aug. 3, 2021

(54) FLUOROELASTOMER COMPOUNDS

(71) Applicant: E I DU PONT DE NEMOURS AND COMPANY, Wilmington, DE (US)

(72) Inventor: Christopher J. Bish, Kennett Square, PA (US)

(73) Assignee: E.I. DEUPONT DE NEMOURS AND COMPANY, Wilmington, DE (US)

( * ) Notice: Subject to any disclaimer, the term of this patent is extended or adjusted under 35 U.S.C. 154(b) by 223 days.

(21) Appl. No.: 16/066,508

(22) PCT Filed: Feb. 17, 2017

(86) PCT No.: PCT/US2017/018259
§ 371 (c)(1),
(2) Date: Jun. 27, 2018

(87) PCT Pub. No.: WO2017/132706
PCT Pub. Date: Aug. 3, 2017

(65) Prior Publication Data
US 2020/0283611 A1    Sep. 10, 2020

Related U.S. Application Data

(60) Provisional application No. 62/287,118, filed on Jan. 26, 2016.

(51) Int. Cl.
| | |
|---|---|
| *C08L 27/18* | (2006.01) |
| *C08K 3/04* | (2006.01) |
| *C08K 5/00* | (2006.01) |
| *C08K 5/25* | (2006.01) |
| *C08K 5/14* | (2006.01) |
| C08K 3/013 | (2018.01) |

(52) U.S. Cl.
CPC ................ *C08L 27/18* (2013.01); *C08K 3/04* (2013.01); *C08K 5/0025* (2013.01); *C08K 5/14* (2013.01); *C08K 5/25* (2013.01); *C08K 3/013* (2018.01); *C08K 2201/005* (2013.01); *C08K 2201/014* (2013.01)

(58) Field of Classification Search
CPC .. C08L 27/18; C08K 3/04; C08K 5/00; C08K 5/25; C08K 5/14; C08K 2201/005; C08K 5/0025; C08K 2201/014
See application file for complete search history.

(56) References Cited

U.S. PATENT DOCUMENTS

| | | |
|---|---|---|
| 5,554,680 A | 9/1996 | Ojakaar |
| 6,646,077 B1 | 11/2003 | Lyons |
| 8,906,821 B2 * | 12/2014 | Grootaert ............. B01J 31/0201 |
| | | 502/167 |
| 9,481,769 B2 | 11/2016 | Bish et al. |
| 2015/0031795 A1 * | 1/2015 | Ihara ........................ C08J 3/20 |
| | | 523/351 |

FOREIGN PATENT DOCUMENTS

| | | | |
|---|---|---|---|
| CN | 10-4844919 | * | 8/2015 |
| WO | 2004/104092 A1 | | 12/2004 |
| WO | 2009/111120 A2 | | 9/2009 |
| WO | 2010/099057 A2 | | 9/2010 |

OTHER PUBLICATIONS

International Search Report in International Application No. PCT/US2017/018259, dated May 18, 2017.

* cited by examiner

*Primary Examiner* — Robert D Harlan
(74) *Attorney, Agent, or Firm* — Maria M. Kourtakis

(57) ABSTRACT

The present invention is directed to compounds comprising a perfluoroelastomer and a blend of two different particle size carbon blacks that, when cured with a curing agent, comprise a heterocyclic or perfluorinated crosslink. Such compounds comprise copolymerized units of unsaturated fluorinated olefins, a perfluoro(vinyl ether), and a cure site fluorinated monomer having a nitrile cure site, plus a blend of carbon blacks. Articles cured from these compounds exhibit improved sealing force.

19 Claims, No Drawings

FLUOROELASTOMER COMPOUNDS

CROSS-REFERENCES TO RELATED APPLICATIONS

This application claims priority under 35 U.S.C. §§ 365 and 371 to International Application No. PCT/US2017/018259, filed on Feb. 17, 2017, which in turn claims priority to U.S. Provisional Appln. No. 62/287,118, filed on Jan. 26, 2016, each of which is incorporated herein by reference in its entirety.

OVERVIEW

Described herein are compounds (also called curable compositions), and expressly including compounds including a perfluoroelastomer with a nitrile cure site, and containing a combination of selected carbon blacks. Also described herein are articles cured from these compounds.

Elastomer compounds that comprise a fluoroelastomer have achieved outstanding commercial success because they can be used in severe environments, in particular, during exposure to high temperatures and to aggressive chemicals. For example, these compounds are used in seals in aircraft engines, in oil-well drilling devices, and as sealing elements in industrial equipment that operate at high temperatures.

The properties of cured elastomer compounds arise largely because of the stability and inertness of the copolymerized fluorinated monomers that make up the major portion of the polymeric backbone of these compounds. Such monomers include tetrafluoroethylene and perfluoro (alkyl vinyl) ethers. In order to develop elastomeric properties fully, fluoroelastomers are typically crosslinked, i.e., vulcanized or cured. To this end, a small percentage of cure site monomer is copolymerized with the other monomers. Upon crosslinking, the cure site monomers react with a curing agent to form a crosslinked elastomer entity in the form of an article. Cure site monomers described herein are focused on a nitrile group cure site. Fluoroelastomers comprising cure site monomers may be cured by any curing agent suitable for use with a nitrile group.

Described herein are compounds that include fluoroelastomers having defined cure site monomers in combination with a mixture of two carbon blacks having different particle size ranges, as well as articles including these compounds. Articles produced from these compounds exhibit improved sealing force compared to compounds comprising a single particle size range carbon black.

DETAILED DESCRIPTION OF THE INVENTION

Abbreviations

The claims and description herein are to be interpreted using the abbreviations and definitions set forth below:
"h", "hrs" refers to hours.
"%" refers to the term percent.
"mole %" refers to mole percent.
"wt %" refers to weight percent.
"parts" refers to parts by weight.
"phr" refers to parts per hundred parts of perfluoroelastomer; one of skill in the art uses and recognizes this term of measurement. For example, 3 parts of a component per 100 parts fluoroelastomer is written as 3 phr. In the compounds, processes, and articles described herein, phr is based on 100 parts of fluoroelastomer A.
"Ph" refers to a phenyl ring.

Definitions

As used herein, the article "a" refers to one as well as more than one and does not necessarily limit its referent noun to the grammatical category of singular number.

As used herein, the terms "about" and "at or about", when used to modify an amount or value, refers to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing, including further curing, in order to become a finished article. When an article is unfinished, the term "preform" may refer to that form, shape, configuration, any part of which may undergo further processing to become finished.

As used herein, when an article is finished, the term "article" refers to an item, thing, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, the term "unsaturated fluorinated olefin" refers to linear, branched, or cyclic hydrocarbon structures which comprise at least one unsaturated double bond and comprise at least one fluorine atom.

As used herein, the term "alkoxy" or "alkoxyl" refers to alkyl groups attached to an oxygen atom by a single bond. The other bond of the oxygen atom is connected to a carbon atom. Examples include methoxy, ethoxy, propoxy, isopropoxy, cyclopropyloxy, and cyclohexyloxy.

As used herein, the term "alkyl" includes linear, branched, or cyclic hydrocarbon structures and combinations of these. Alkyl does not include aromatic structures. Examples of linear alkyl groups include methyl, ethyl, propyl, butyl, pentyl, and hexyl groups. Branched alkyl groups include for example s-and t-butyl, and isopropyl groups. Examples of cyclic hydrocarbon groups include cyclopropyl, cyclopentyl, cyclohexyl, cyclobutyl, and cyclooctyl groups. Examples include methoxy, ethoxy, propoxy, isopropoxy, cyclopropyloxy, and cyclohexyloxy.

As used herein, the term "compound" refers to a composition that is able to be cured, i.e., a curable composition, as well as to a mixture of chemical entities that comprises at least a fluoroelastomer and a curing agent. The mixture of chemical entities has not been cured nor has undergone processing conditions that would cause the curing of the mixture of chemical entities to undergo curing.

As used herein, the prefix term "fluoro", when placed as a prefix before a chemical entity name, refers to a chemical entity that has at least one fluorine atom as exemplified by the following designations: fluoroelastomers, perfluoroelastomers, fluorovinyl, and perfluorovinyl ethers. The prefix "fluoro", when placed as a prefix before a chemical entity name, expressly includes "perfluoro" chemical entities. Thus, the prefix "fluoro", when preceding a chemical entity name, indicates both "fluoro-" entities and "perfluoro-" entities.

As used herein, the term "cured" refers to that resultant entity that comprises a fluoroelastomer and which has been exposed to those conditions that caused the fluoroelastomer molecules to form sufficient crosslinks among themselves (that is, curing conditions) such that the resultant entity takes on a form or shape or configuration or structure that cannot be reprocessed, molded, or extruded into a different one. That is, once a resultant entity which comprised a fluoroelastomer has been exposed to curing conditions to thereby be cured, that entity cannot be re-cured to take on a substantially different form or shape or configuration or structure.

As used herein, the terms "curing", "cured" refer to that processing of a compound comprising a fluoroelastomer, also called herein curable composition, which results in an entity taking on a form or shape or configuration or structure that cannot be reprocessed, molded, or extruded into a different one. Such processing refers to the "curing process/processing", which requires the compound to be exposed to certain conditions in order to initiate the curing process, such conditions called curing conditions.

The resultant entity of the curing process is a "cured" entity, that is, an article as defined hereinabove. To be clear, curing results in the compound taking on a form or shape or configuration or structure of an article. Cured articles of compounds comprising a fluoroelastomer include, but are not limited to, O-rings, seals, and gaskets.

The terms "curing", "cured" also expressly include differing degrees of processing of a compound such that the resultant entity takes on a form or shape or configuration or structure that cannot be reprocessed, molded, or extruded into a different one and which may exhibit certain physical properties as a result of the curing.

To the point, a compound may be initially cured to achieve a non-reprocessable form, shape, etc., which has been termed "cured" herein. The cured compound may be further subjected to additional curing conditions, which provide additional, subsequent curing. Such additional curing conditions may be variously termed herein either as "curing" or as "post-curing". That is, the terms "curing", "cured" refer to both an initial curing process that results in a first cured, resultant entity and also expressly refer to any subsequent curing process that results in a subsequently cured, resultant entity that may or may not possess different material or physical properties than those of the first cured, resultant entity.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. The compounds, processes and articles described herein are not limited to specific values disclosed in defining a range in the description.

The disclosure herein of any variation in terms of materials, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, the chemical structure takes precedence over the chemical name. And, if there are errors in the chemical structures of any chemical species described herein, the chemical structure of the chemical species that one of skill in the art understands the description to intend prevails.

Generally

Described herein are compounds which include compounds comprising a perfluoroelastomer having a nitrile cure site monomer and a combination of two different particle size carbon blacks. Further, the present invention is directed to articles prepared by curing the compounds described herein and processes for curing the compounds described herein.

More specifically, the compounds described herein include a blend of carbon blacks for enhanced sealing performance, specifically compression stress relaxation performance, the compound comprising:
  A. a perfluoroelastomer comprising a nitrile cure site;
  B. a blend of carbon blacks comprising:
    1) a large particle size carbon black having a particle size ranging from about 150 to 500 nm,
    2) a small particle size carbon black having a particle size ranging from about 1 to 100 nm,
  C. a curing agent,
wherein the ratio of (1) to (2) ranges from 20 to 1 to 4 to 1.

The nitrile cure site monomer used to prepare the perfluoroelastomer comprises nitrile-containing fluorinated olefins and nitrile-containing fluorinated vinyl ethers, as described herein. The curative is any compound that can produce a cured compound in which the cross-link comprises a heterocyclic structure or fully fluorinated hydrocarbon. The heterocyclic structure can be aromatic or cycloaliphatic.

The processes described herein are directed to preparing a compound comprising a perfluoroelastomer and a blend of two different particle size ranges of carbon blacks and a curing agent, including the step of curing a compound that includes A) a perfluoroelastomer comprising a nitrile cure site; B) a blend of carbon blacks comprising: (1) a first carbon black having a particle size ranging from about 1 to about 100 nm, and (2) a second carbon black having a particle size ranging from about 150 to about 500 nm, and C) a curing agent, wherein the cured compound comprises a cross-link which is a heterocyclic structure or fully fluorinated hydrocarbon.

Specifically, a process for curing the compound described herein comprises the step of: a) heating the compound at a temperature ranging from about 150 to 325° C. to provide a cured compound, the cross-link of the cured compound being a heterocyclic structure or fully fluorinated hydrocarbon.

Also described herein are articles that have been prepared by curing the compounds described herein.

Variations in the compounds, articles, and processes for curing compounds described herein may expressly include any of the following elements or any combination of the following elements. That is, it is expressly contemplated that the compounds, articles and processes described herein and recited in the claims may be varied to include the specific elements listed in this paragraph or any combination of these specific elements:

A) Fluoroelastomers

Fluoroelastomers described herein may be perfluorinated and may include copolymerized monomer units of tetrafluoroethylene, hexafluoropropylene, or mixtures of these and one or more fluorovinyl ether monomers selected from the group consisting of perfluoro(alkyl vinyl) ethers, perfluoro (alkoxy vinyl) ethers, and mixtures of these; and a cure site monomer comprising a nitrile group.

Suitable fluorovinyl ether monomers include those having any one of formula (II), (III), (IV), (V) or (VI) hereinbelow.

$$CF_2=CFO(R_fO)_n(R_{f'}O)_mR_f \qquad (II),$$

where $R_f$, and $R_{f'}$ are linear or branched perfluoroalkylene groups of 2-6 carbon atoms, m and n are independently 0-10, and $R_f$ is a perfluoroalkyl group of 1-6 carbon atoms.

$$CF_2=CFO(CF_2CFXO)_nR_f \qquad (III),$$

where X is F or $CF_3$, n is 0-5, and $R_f$ is a perfluoroalkyl group of 1-6 carbon atoms. Preferably, n is 0 or 1 and $R_f$ contains 1-3 carbon atoms. Examples of such fluorovinyl ether monomers include perfluoro(methyl vinyl) ether and perfluoro(propyl vinyl) ether.

$$CF_2=CFO[(CF_2)_mCF_2CFZO]_nR_f \qquad (IV),$$

where $R_f$ is a perfluoroalkyl group having 1-6 carbon atoms, m=0 or 1, n=0-5, and Z=F or $CF_3$.

$$CF_2=CFO[(CF_2CFCF_3O)_n(CF_2CF_2CF_2O)_m(CF_2)_p]C_xF_{2x+1} \qquad (V),$$

where m and n=1-10, p=0-3, and x=1-5 and includes monomers where n=0-1, m=0-1 and x=1.

$$CF_2=CFOCF_2CF(CF_3)O(CF_2O)_mC_nF_{2n+1} \qquad (VI),$$

where n=1-5, m=1-3, and where, preferably, n=1.

Mixtures of perfluoro(alkyl vinyl) ethers and perfluoro (alkoxy vinyl) ethers may also be used.

Cure Site Monomer

The fluoroelastomer further includes copolymerized units of one or more cure site fluorinated monomers. Suitable cure site monomers include fluorinated olefins that include nitrile groups.

Suitable cure site monomers may include nitrile-containing fluorinated olefins and nitrile-containing fluorinated vinyl ethers. Useful nitrile-containing cure site monomers include compounds of formulae $$CF_2=CF-O(CF_2)_n-CN \qquad (IX),$$

where n=2-12, preferably 2-6;

$$CF_2=CF-O[CF_2-CFCF_3-O]_n-CF_2-CFCF_3-CN \qquad (X),$$

where n=0-4, preferably 0-2;

$$CF_2=CF-[OCF_2CFCF_3]_x-O-(CF_2)_n-CN \qquad (XI),$$

where x=1-2, and n=1-4;
and $$CF_2=CF-O-(CF_2)_n-O-CF(CF_3)CN \qquad (XII),$$

where n=2-4.

Especially preferred cure site monomers comprising a nitrile group include perfluorinated polyethers having a nitrile group and a trifluorovinyl ether group. A most preferred cure site monomer is perfluoro(8-cyano-5-methyl-3, 6-dioxa-1-octene) (8-CNVE) and represented by formula (XIII):

$$CF_2=CFOCF_2CF(CF3)OCF2CF2CN \qquad (XIII)$$

The fluoroelastomer may comprise any of a variety of end groups as a result of the use of varying initiators or chain transfer agents during polymerization. Non-limiting examples of end groups include sulfonate, sulfonic acid, carboxylate, carboxylic acid, carboxamide, difluoromethyl groups, trifluorovinyl groups, or perfluorinated alkyl groups.

B) Carbon Blacks

Carbon black is known to balance modulus, tensile strength, elongation, hardness, abrasion resistance, conductivity, and processability of polymer compositions. In the compounds described herein, a combination of carbon black particles is used, each having a different particle size range when measured according to ASTM D1765.

Small Particle Size Carbon Black

Small particle size carbon blacks (SCB) as disclosed herein typically have particle sizes of about 1 nm to less than 100 nm, preferably about 5 nm to 80 nm, and more preferably from about 5 nm to 50nm. Examples of small particle size carbon blacks include SAF carbon black, Spheron 6400® and FEF carbon. and designated N110 in Group No. 1, according to ASTM D1765. Small particle size carbon blacks are present in the compound in an amount ranging from 2 to 8 phr.

Large Particle Size Carbon Black

Large particle size carbon blacks (LCB) as disclosed herein include carbon blacks that have particle sizes of at least about 150 nm to about 500 nm, preferably about 200 nm to about 500 nm, as determined by ASTM D3849. Non-limiting examples include MT blacks (medium thermal black) designated N-991, N-990, N-908, and N-907, and large particle size furnace blacks, of which MT blacks are preferred. Large particle size carbon blacks are present in the compound in an amount ranging from 20 to 60 phr.

It is preferred that the large particle size carbon black is present in the compound at a concentration which is at least 4 times up to 30times the concentration of the small particle size carbon black. In other words, the ratio of the large particle size carbon black to small particle size carbon black (LCB:SCB) ranges from about 8:1 to 4:1. The total concentration of all carbon black particles in the compound ranges from about 5 to 100 phr, preferably from 5 to 50 phr.

C) Curing Agent

Curing agents for the compounds described herein include any compound that can produce a cross-link which comprises a heterocyclic structure or fully fluorinated hydrocarbon structure. More specifically, the curing agent can be carbohydrazide, isophthalic dihydrazide, t-butyl carbazate, or oxalydihydrazide.

Preferred curing agents are certain hydrazide based curing agents that create a heterocyclic structure in the crosslink and the resulting cured compound or article, when compression stress relaxation tested at 225° C. for at least 504 hours at 20% compression, exhibits a sealing force which is at least 20% greater than the sealing force of an identical article (e.g., O-ring) comprising only a single particle size carbon black when measured for the same duration and by the same method.

Examples of hydrazide curing agents include mono-, di-, or poly-hydrazides and can be of the general formula R1(C(O))nNHNHR2, wherein n is 1 or 2; R1 is NH2, NHNH2, NHR3, NR32, NHNHC(O)NH2, NHNHC(O)NHNH2, NHNHR2, or NHC(O)NHNH2; R2 is H, alkyl, aryl, heterocycle, CO2R3, C(O)R3, CH2R4, or C(O)R4; R3 is alkyl, aryl, heterocycle, or CH2R4; and R4 is a fluoroalkyl group. The alkyl, aryl, benzyl or heterocycle groups may contain additional functional groups such as, but not limited to halogen, ether, or amide groups. The fluoroalkyl group has at least one of the hydrogen atoms replaced by fluorine and may optionally contain 1 or more oxygen atoms in the chain. R2, R3, or R4 may have 1, 2, or more points of attachment to a hydrazide to afford mono-, di-, or poly-hydrazide.

Preferred hydrazide curing agents include those wherein n is 1; R1 is NH2, NHNH2, NHR3, NR32, NHNHC(O)NH2, NHNHC(O)NHNH2, NHNHR2, or NHC(O)NHNH2; and R2 is H; n is 2; R1 is NH2, NHNH2, NHR3, NR32, NHNHC(O)NH2, NHNHC(O)NHNH2, NHNHR2, or NHC(O)NHNH2; and R2 is H; n is 1; R1 is NH2, NHNH2, NHR3, NR32, NHNHC(O)NH2, NHNHC(O)NHNH2, NHNHR2, or NHC(O)NHNH2; and R2 is CO2R3; and n is 2; R1 is NH2, NHNH2, NHR3, NR32, NHNHC(O)NH2, NHNHC(O)NHNH2, NHNHR2, or NHC(O)NHNH2; and R2 is CO2R3.

Specific examples of these hydrazide curatives include, but are not limited to carbohydrazide; carbonic dihydrazide, dihydrochloride; 4-phenylsemicarbazide; 4-phenylsemicarbazide hydrochloride; 4,4- diphenylsemicarbazide; oxamic hydrazide; oxalyldihydrazide; semicarbazide; 1,2-hydrazinedicarboxylic acid, dihydrazide; diaminobiuret; thiocarbohydrazide; and thiosemicarbazide. An example of a dihydrazide is p-phenylenebissemicarbazide. More preferred hydrazides include carbohydrazide; 4-phenylsemicarbazide; oxamic hydrazide; semicarbazide, and oxalyldihydrazide. Preferably the curing agent is oxalydihydrazide.

The compounds described herein may also be cured with a peroxide and a co-agent to provide articles which are also stable to high temperature aqueous environments. Useful peroxide curing agents are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiary-butylperoxy)hexyne-3 and 2,5-dimethyl-2,5-di(tertiary-butylperoxy)hexane. Other peroxides can be selected from such compounds as dicumyl peroxide, dibenzoyl peroxide, tertiarybutyl perbenzoate, and di[1,3-dimethyl-3-(t-butylperoxy)-butyl]carbonate. Generally, about 1-3 parts of peroxide per 100 parts of perfluoroelastomer is used. Another material which is usually blended with the composition as a part of the peroxide curative system is a co-agent composed of a polyunsaturated compound which is capable of cooperating with the peroxide to provide a useful cure. These coagents can be added in an amount equal to 0.1 and 10 parts per hundred parts perfluoroelastomer, preferably between 2-5 parts per hundred parts fluoroelastomer.

The concentration of curing agent in the compounds described herein range from about 0.05 to 7 phr, preferably about 0.1 to 3 phr, and more preferably from about 0.5 to 2 phr of perfluoroelastomer.

Co-agent

If peroxide cured, the compounds described herein include one or more co-agents, which include, but are not limited to, dibromopropyl isocyanurate, tri(methyl)allyl isocyanurate (TMAIC), triallyl isocyanurate (TAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(dial-lylamine)-s-triazine, triallyl phosphite, 1,2-polybutadiene, ethylene glycol diacrylate, and diethylene glycol diacrylate. Other co-agents may have the formula (XIV):

CH2=CH—R⁴—CH=CH2 (XIV), wherein $R^4$ may be a perfluoro alkylene of 1 to 8 carbon atoms.

The concentration of one or more co-agents, when included, ranges from about 0.1 to 10 phr, preferably 0.5 to 5 phr.

Fully Fluorinated Hydrocarbon Crosslinks

The compounds described herein may additionally be cured by heating the compound with Cl—F at a temperature ranging from about 250 to 325° C. Cl—F can be prepared by reacting chlorine with fluorine as disclosed in Gambaretto et al., J. Fluorine Chem. 7, 569(1976). Reaction of compounds disclosed herein with Cl—F provides cured compounds which comprise fully fluorinated hydrocarbon crosslinks. Such curing processes are described in U.S. Pat. No. 9,481,769.

The compounds described herein, when cured into articles, exhibit a surprising improvement in sealing force compared to identically cured compounds that comprise a single particle size range carbon black.

Additives

The compounds described herein may include one or more additives, such as stabilizers, plasticizers, lubricants, and processing aids, which are typically utilized in fluoroelastomer compounding, when these retain adequate stability for the intended use. In particular, perfluoropolyethers can enhance low temperature performance.

Tetrafluoroethylene polymers used as additives in the compounds described herein include copolymers of TFE having sufficient concentrations of copolymerized units of one or more monomers to reduce the melting point below that of PTFE. Such copolymers generally have melt viscosity in the range of $0.5\text{-}60\times10^3$ Pa·s, but viscosities outside this range are also known.

The concentration of additives, if present in these compounds, may range from 0.01 to 100 phr, preferably about 1 to 30 phr, and more preferably from about 5 to 30 phr.

Preparing Compounds Described Herein and Curing Articles Described Herein that Comprised These Compounds The compounds described herein may be prepared by mixing until homogeneous fluoroelastomer, curing agent, carbon blacks, and filler(s), additives, and co-agents, when present, using rubber compounding procedures such as a two roll rubber mill, an internal mixer, for example, a Banbury internal mixer, or in an extruder.

The compounds described herein may be cured by the application of heat and/or of pressure sufficient to cause the curing agent(s) or Cl—F to form crosslinks with cure site monomer(s). A dual cure system may also be used to cure the compounds. When compression molding is used to cure, a press cure cycle is preferably followed by a post cure cycle during which the press cured compound is heated at elevated temperatures in excess of 300° C. for several hours. The compounds described herein, when cured, become articles described herein and exhibit useful and suitable thermal stability and chemical resistance for the applications in which these articles are used. These articles are particularly useful as seals and gaskets for high temperature applications and in a broad range of chemical environments, and in seals for high temperature automotive uses, and as O-rings.

The compounds described herein may be cured into articles such as O-rings and seals. It is believed that the relationship of the elastomer and the combination of carbon black particle sizes with the curing agent, and one or more optional filler(s) and additives, to cure the compounds described herein, results in articles described herein (also known as cured compounds).

Sealing Force

The sealing force of articles described herein may be measured by compression stress relaxation testing. Such articles, when in the shape of an O-ring having an inner diameter of 25 mm, a cross-section diameter of 3.53 mm, and an outer diameter of 32.05 mm (214 O-rings) are compression stress relaxation tested at 225° C. for at least 504 hours at 20% compression, exhibit a sealing force which is at least 7 percent greater than the sealing force of an identical O-ring comprising only a single particle size carbon black when measured for the same duration and by the same method. Preferably the improvement in sealing force relative to the control is at least 10 percent, more preferably at least 15 percent, and most preferably at least 20 percent. The control is an identical O-ring but which comprises only a single particle size range carbon black.

Compression stress relaxation testing is different than compression set testing. Modification of a polymer composition to improve compression set may not improve compression stress relaxation.

In a compression set test, a sample is compressed under a given force for a set time and temperature and then the force is removed. The resulting deformation or unrecovered strain of the sample is then measured. In a compression stress relaxation test, the sample may be similarly compressed and aged, but after aging, the sample is maintained in its compressed condition, where sealing force is measured after various time periods. The sealing force may be measured after various time periods to determine if the sealing force deteriorates overtime. Compression stress relaxation is measured while the polymer is under compression whereas compression set is measured after the compression force on the polymer has been removed. Thus, differences in polymer composition may have different effects on compression set compared to compression stress relaxation.

Fluoroelastomers and perfluoroelastomers have different chemical compositions and may exhibit different responses to compression set and compression stress relaxation tests. The article titled Perfluoroelastomer and Fluoroelastomer Seals for Photovoltaic Cell Manufacturing Processes presented at InterSolar SMET, May 2009 discloses, in general, that fluoroelastomers and perfluoroelastomers exhibit different chemical resistance to acids and bases, compression set, and seal force retention values with the perfluoroelastomer exhibiting superior performance relative to the fluoroelastomer. Any teachings relating to additives for improving the performance of fluoroelastomers may not translate to perfluoroelastomers.

EXAMPLES

The exemplary compounds identified in the tables below are intended only to further illuminate and not to limit the scope of compounds, processes, and articles described and recited herein. Examples are identified as E1W and E2W. Comparative examples are identified as C1W. Each example and comparative example was tested twice and the values averaged (C1Wav, E1Wav and E2Wav).

Materials

In the compounds, processes, and articles exemplified in the tables below, the following materials were used:
FFKM: a perfluoroelastomer prepared by the process disclosed in U.S. Pat. No. 6,646,077, cols. 9 to 10; available from E.I. DuPont de Nemours and Company, Wilmington, Del., USA ["DuPont"].
Curing Agents: Oxalydihydrazide available from Sigma-Aldrich, USA.
SCB-A: a small particle size carbon black, available as FEF carbon.
SCB-B: a small particle size carbon black available from Cabot Corporation, USA as Spheron 6400®
LCB: a large particle size thermal carbon black having an average particle size of 280 nm, available as Thermax® N990 from Cancarb.

Methods

In the compounds, processes, and articles exemplified in the tables below, the following methods were used.

Specific Process for Preparing Articles Described Herein

The following specific process may be used to prepare articles described herein from compounds described herein. A sheet of compound was extruded on a roll mill to a thickness of about 2 mm. One inch diameter circular washers were punched out of the extruded sheet. If the one inch circular washer weighs less than 2.5 g, the sheet is re-extruded with a wider gap in the nip roll until a punched test sample is at least 2.5 g. Circular washer test samples of the compound were used to prepare O-rings by the following cure process.

Standard 214 O-rings having an inner diameter of 24.99 mm (0.984 inches) and a cross-section diameter of 3.53 mm (0.139 mm) were compression molded from the circular washer test samples in an 8"×8" PHI press using max. 35000 psi pressure at 199° C. for TC91 plus 5 minutes. The O-ring samples were further cured, i.e., post-cured, using a press cure cycle generally followed by a post cure cycle during which the press cured composition is heated at elevated temperatures in excess of 300 C for several hours. The O-rings were used for compression stress relaxation testing with the results shown in Tables 1 and 2.

The O-rings, prepared as described, were tested by compression stress relaxation using Wykeham-Farrance jigs testing process; Tuckner, Paul, *Fall Technical Meeting of the Rubber Division,* American Chemical Society, 182nd, Cincinnati, Ohio, United States, Oct. 9-11, 2012 Volume 3 Pages 1550-1572.

Determination of Sealing Force by Compression Stress Relaxation

O-rings (3 cm×0.34 cm), prepared as described in the immediately preceding paragraphs, were compression stress relaxation tested at 225° C. for up to 1176 hours in water using Wykeham Farrence jigs as described above.

Table 1 discloses the compositions of examples of compounds described herein and comparative examples. Table 2 shows compression stress relaxation test results in water at 225° C. and measured at 90° C. and 20% compression.

TABLE 1

| Components (PHR*) | C1W | E1W | E2W |
|---|---|---|---|
| FFKM | 100 | 100 | 100 |
| LCB (phr) | 50 | 40 | 40 |
| SCB-A (phr) |  | 5 |  |
| SCB-B (phr) |  |  | 5 |
| Oxalydihydrazide | 0.89 | 0.89 | 0.89 |

TABLE 2

|  | C1W-1 | C1W-2 | C1W av | E1W-1 | E1W-2 | E1W av | E2W-1 | E2W-2 | E2 av |
|---|---|---|---|---|---|---|---|---|---|
| 168 hrs | 114.9 | 126.8 | 120.8 | 126.9 | 133.0 | 129.95 | 124.7 | 116.2 | 120.45 |
| 336 hrs | 72.1 | 79.4 | 75.75 | 96.7 | 101.4 | 99.05 | 86.9 | 76.1 | 81.5 |
| 504 hrs | 44.0 | 52.8 | 48.4 | 87.6 | 93.2 | 90.4 | 82.4 | 70.1 | 76.25 |
| 672 hrs | 32.8 | 35.3 | 34.05 | 77.0 | 83.9 | 80.45 | 71.6 | 61.1 | 66.35 |
| 840 hrs | 26.3 | 27.7 | 27 | 69.9 | 72.2 | 71.05 | 63.9 | 52.2 | 58.05 |
| 1008 hrs | 16.0 | 16.5 | 16.25 | 66.0 | 71.9 | 68.95 | 57.1 | 48.9 | 53 |
| 1176 hrs | 13.1 | 15.8 | 14.45 | 60.1 | 64.8 | 62.45 | 53.2 | 43.8 | 48.5 |

Av—average of values

As can be seen from the data in Table 2, after 168 hours of testing, C1W exhibits a sealing force of 114.9 and 126.8 N (Newtons) in a first and second trial respectively. E1W exhibits a sealing force value of 126.9 and 133.0 N in a first and second trial respectively, and E2W exhibits a sealing force value of 124.7 and 116.2 N in a first and second trial. However, a significant difference is evidenced in C1W versus E1W and E2W at time progresses. At 1776 hours, C1W exhibits a sealing force value of 13.1 and 15.8 N in a first and second trial respectively. E1W exhibits a sealing force value of 60.1 and 64.8 N (Newtons) in a first and second trial respectively, and E2W exhibits a sealing force value of 53.2 and 43.8 N in a first and second trial. The improvement in sealing force of E1W and E2W vs. C1W is approximately 3 times. Comparative example C1W and examples E1W and E2W are prepared from the same perfluoroelastomer using the same curative. C1W exhibit a decrease in compression stress relaxation when measured at 168 hrs and 1176 hrs of at least 87.5 percent. In contrast, example E1W exhibits a maximum decrease of only 52.6 percent and E2W exhibits a maximum decrease in compression stress relaxation of 62.3 percent.

These results show that the compounds described herein, when cured with a curing agent and formed into O-rings, exhibit better high temperature compression stress relaxation sealing force values when tested for a time period of 168 hours to 1176 hours, compared to sealing force values for an identical compound but which comprises a single particle size range carbon black.

These are surprising results considering the significant change in compression stress relaxation values of compounds comprising a perfluoroelastomer and two different particle size ranges of carbon blacks compared to identical compounds which comprise only a single particle size range carbon black. The addition of less than 10 phr of a small particle size carbon black in addition to a large particle size carbon black, which is present at higher concentration in the compound, provides dramatic change in compression stress relaxation compared to compounds comprising a single carbon black.

What is claimed is:

1. A compound comprising:
   A. a perfluoroelastomer comprising a nitrile cure site;
   B. a blend of carbon blacks comprising:
      1) a large particle size carbon black having a particle size ranging from about 150 to 500 nm, and
      2) a small particle size carbon black having a particle size ranging from about 1 to 100 nm; and
   C. a curing agent;
wherein the ratio of the concentration of the large particle size carbon black (1) to the concentration of the small particle size carbon black (2) ranges from 20 to 1 to 4 to 1, said concentrations expressed in units of phr.

2. The compound of claim 1, wherein the curing agent produces a crosslink comprising a heterocyclic structure or a perfluorinated hydrocarbon structure.

3. The compound of claim 1, wherein the curing agent produces a crosslink comprising a heterocyclic structure.

4. The compound of claim 2 wherein the curing agent is a hydrazide based curing agent, peroxide, or Cl—F.

5. The compound of claim 2, wherein the heterocyclic structure is aromatic or cycloaliphatic.

6. The compound of claim 1, wherein the perfluoroelastomer is prepared from a nitrile cure site monomer selected from the group consisting of nitrile-containing fluorinated olefins, nitrile-containing fluorinated vinyl ethers, and combinations of these.

7. The compound of claim 3, wherein the curing agent is selected from the group consisting of carbohydrazide; carbonic dihydrazide dihydrochloride; 4-phenylsemicarbazide; 4-phenylsemicarbazide hydrochloride; 4,4-diphenylsemicarbazide; oxamic hydrazide; oxalyldihydrazide; semicarbazide; 1,2-hydrazinedicarboxylic acid; dihydrazide; diaminobiuret; thiocarbohydrazide; t-butyl carbazate; isophthalic dihydrazide; thiosemicarbazide; and p-phenylenebissemicarbazide.

8. The compound of claim 1, wherein the large particle size carbon black has a particle size ranging from about 200 nm to about 500 nm as determined by ASTM D 3849.

9. The compound of claim 1, wherein the small particle size carbon black has a particle size ranging from about 1 nm to less than about 80 nm as determined by ASTM D 3849.

10. The compound of claim 1, wherein the small particle size carbon black has a particle size ranging from about 5 nm to less than about 50 nm as determined by ASTM D 3849.

11. The compound of claim 1, wherein the ratio of the concentration of carbon black (1) to that of carbon black (2) ranges from about 10:1 to 4:1.

12. The compound of claim 1, wherein the concentration of the large particle size carbon black is from about 40-60 parts per hundred parts perfluoroelastomer.

13. The compound of claim 1, wherein the concentration of the small particle size carbon black is from about 2-8 parts per hundred parts perfluoroelastomer.

14. The compound of claim 1, additionally comprising at least one additive in a concentration of from about 1-90 parts per hundred parts perfluoroelastomer.

15. The compound of claim 14, wherein the at least one additive is selected from the group consisting of tetrafluoroethylene polymers, stabilizers, plasticizers, lubricants, and processing aids.

16. The compound of claim 1, additionally comprising a co-agent in a concentration of from about 0.1-10 parts per hundred parts perfluoroelastomer.

17. The compound of claim 1 which upon curing has a sealing force that is at least 7 percent greater than the sealing force of an otherwise identical cured compound comprising only a single particle size carbon black.

18. An article comprising the compound of claim 1 or a product of curing the compound of claim 1, said article selected from the group consisting of a gasket, a seal, tubing, a diaphragm, or an O-ring.

19. A process for curing the compound of claim 1 comprising the step of heating the compound at a temperature ranging from about 150 to 325° C. to provide a cured compound, whereby the cross-link of the cured compound is a heterocyclic structure or a perfluorinated hydrocarbon.

* * * * *